(12) United States Patent
Helmholz et al.

(10) Patent No.: US 9,576,507 B2
(45) Date of Patent: Feb. 21, 2017

(54) PLACARD HOLDER

(71) Applicants: Craig Stanley Helmholz, Sherwood, OR (US); Martin Joseph Castro, Newberg, OR (US)

(72) Inventors: Craig Stanley Helmholz, Sherwood, OR (US); Martin Joseph Castro, Newberg, OR (US)

(73) Assignee: PURR-FECTION BY MJC, INC., Tualatin, OR (US)

( * ) Notice: Subject to any disclaimer, the term of this patent is extended or adjusted under 35 U.S.C. 154(b) by 0 days.

(21) Appl. No.: 14/808,501

(22) Filed: Jul. 24, 2015

(65) Prior Publication Data

US 2017/0025045 A1  Jan. 26, 2017

(51) Int. Cl.
*G09F 1/10* (2006.01)
*F16B 5/02* (2006.01)
*F16B 21/00* (2006.01)

(52) U.S. Cl.
CPC .............. *G09F 1/10* (2013.01); *F16B 5/0258* (2013.01); *F16B 21/00* (2013.01); *Y10T 29/49948* (2015.01); *Y10T 29/49952* (2015.01); *Y10T 29/49954* (2015.01)

(58) Field of Classification Search
CPC ................. G09F 1/10; Y10T 29/49954; Y10T 29/49948; Y10T 29/49952; F16B 5/0258; F16B 21/00
See application file for complete search history.

(56) References Cited

U.S. PATENT DOCUMENTS

| | | | | |
|---|---|---|---|---|
| D101,143 S | * | 9/1936 | Shank | 211/50 |
| 3,007,726 A | * | 11/1961 | Parkin | F16B 21/205 |
| | | | | 135/77 |
| D337,255 S | * | 7/1993 | Novelli, Sr. | D30/155 |
| 5,613,602 A | | 3/1997 | Lage et al. | |
| 7,240,802 B2 | | 7/2007 | Jones | |
| 8,028,453 B2 | * | 10/2011 | Fornataro | G09F 1/14 |
| | | | | 248/174 |

* cited by examiner

Primary Examiner — John C Hong
(74) Attorney, Agent, or Firm — Jeffrey C. Lew

(57) ABSTRACT

A placard holder has a clamp member with an enlarged head and an elongated stem. The head defines a narrow slot such that a card containing visually perceptible or machine readable information can be mounted to the head by a friction fit of an edge of the card inserted into the slot. The clamp member attaches to a supporting article such as a display stand by extending the stem through a hole of a thin wall of the support and placing a lock washer over the stem opposite the head. The lock washer is forced along the stem end to compress the wall between it and the head. Compression is maintained by prongs of the lock washer that engage radially protruding teeth disposed along the elongated stem. Paper or plastic placards such as business cards, credit cards, place cards, gift cards can be placed in the placard holder for display.

17 Claims, 4 Drawing Sheets

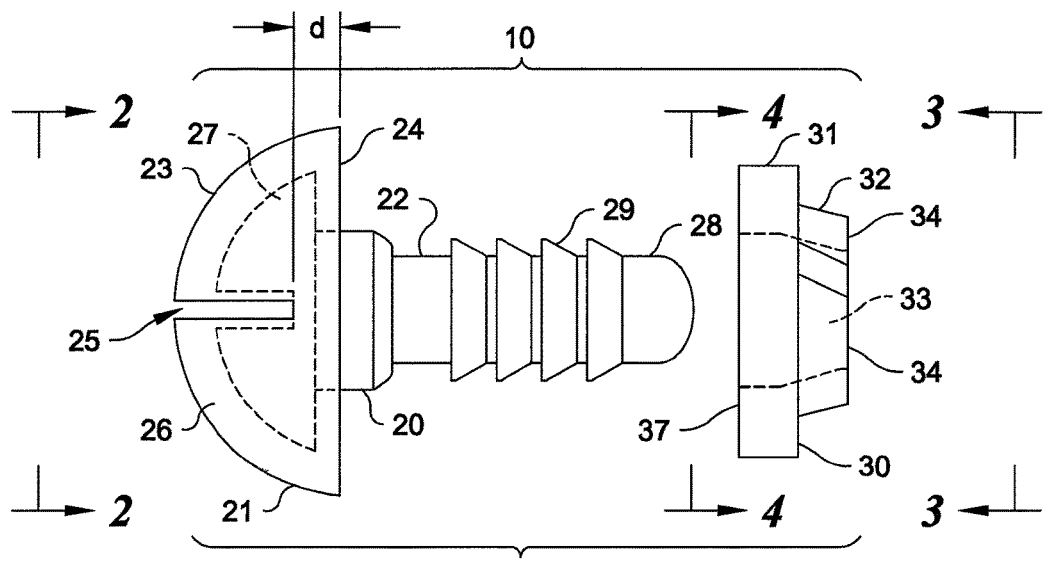
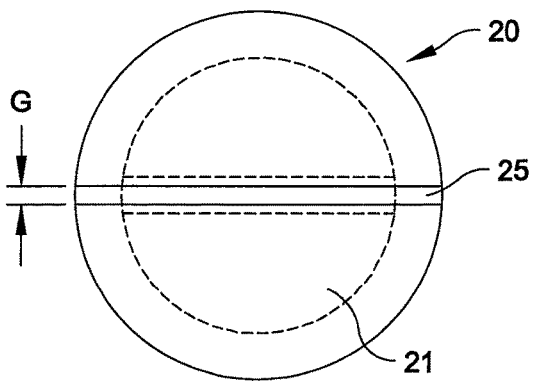
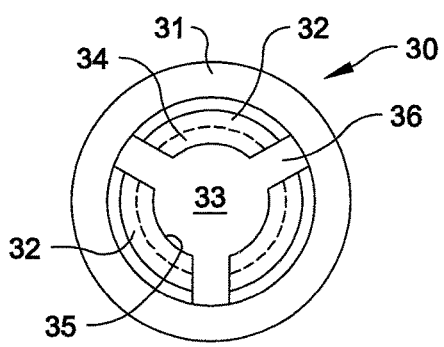
Fig. 1
Fig. 2
Fig. 3

PLACARD HOLDER

FIELD OF THE INVENTION

This invention relates to a placard holder that accepts and displays promotional and utilitarian material in a card form. More specifically, it relates to a device that can hold a small card in position for viewing and access by a card user, and that can be attached to an article having a thin mounting structure, such as fabric and paperboard. For example, the article can be as a plush animal toy or other decorative object and the placard is normally about the size and shape as typical business or credit cards.

BACKGROUND OF THE INVENTION

Various types of holders for placards are in common use for many purposes. Some known examples include albums with fixed or looseleaf pages having compartments with clear plastic windows for storing and displaying business cards, trays for holding a card stack or a single card, and shelf or pegboard racks for displaying gift cards at retail locations such as supermarkets and convenience stores. These card holders advantageously organize and effectively present the placards for inspection by the user-consumer. Many existing holders are primarily utilitarian and lack distinctiveness and visually aesthetic attractiveness. Thus, there is a need for a placard holder that enables distinctive display of a card with visually pleasing aesthetic effect.

SUMMARY OF THE INVENTION

This invention relates to a placard holder that has a clamp member with an elongated body and one enlarged end with a slot suitable to accept a card containing visually perceptible information. The clamp member attaches to a supporting article, such as a display stand, by extending the elongated body of the other end of the clamp member through a thin wall of the supporting article and placing a lock washer over the other end. The placard holder is affixed to the support by moving the lock washer toward the enlarged end thereby compressing the wall between the clamp member and lock washer. The lock washer is preferably secured in position by prongs of the lock washer engaging radially protruding teeth located along the elongated body. Business cards, credit cards, place cards, gift cards etc. can be removably held for display by a friction fit of the card edge in the slot.

The invention thus provides a placard holder comprising a clamp member and a lock washer in which the clamp member comprises a body comprising (i) an enlarged head having a front side defining a card slot and back side having a flat back face, and (ii) an elongated stem extending away from the back side of the head, and in which the lock washer comprises (a) a hollow cylinder having a base at one end of the cylinder, the base defining a land surface and in which the cylinder has a lumen extending along an axis from the base, and (b) a plurality of prongs at the end of the the hollow cylinder opposite the base, the prongs forming a truncated conical configuration that tapers to smaller diameter with axial distance from the base, and in which the lock washer is adapted to mate with the the clamp member by insertion of the stem into the lumen.

The invention further provides a method of displaying a placard comprising the steps of (I) providing a clamp member comprising a body comprising (i) an enlarged head having a front side defining a card slot and back side having a flat back face, and (ii) an elongated stem extending away from the back side of the head, (II) providing a lock washer comprising (a) a hollow cylinder having a base at one end of the cylinder, the base defining a land surface and in which the cylinder has a lumen extending along an axis from the base, and (b) a plurality of prongs at the end of the the hollow cylinder opposite the base, the prongs forming a truncated conical configuration that tapers to smaller diameter with axial distance from the base, (III) providing a support article having a wall defining a hole passing through the wall, (IV) inserting the clamp member into the hole such that the head is on one side of the wall and the stem protrudes through the hole to the opposite side of the wall, (V) inserting the stem into the lumen with the base of the hollow cylinder oriented toward the back face of the head, thereby mounting the lockwasher on the clamp member on the opposite side of the wall, and (VI) moving the lockwasher along the axis of the clamp member toward the head and compressing the wall between the back face of the head and the base of the lock washer effectively to affix the clamp member and lock washer relative to the wall.

BRIEF DESCRIPTION OF THE DRAWINGS

FIG. 1 is an exploded side view of a clamp member and lock washer according to an embodiment of the placard holder according to this invention.

FIG. 2 is an elevation end view of the clamp member of FIG. 1 taken along line 2-2.

FIG. 3 is an elevation end view of the lock washer of FIG. 1 taken along line 3-3.

DETAILED DESCRIPTION OF THE INVENTION

Figure 4:
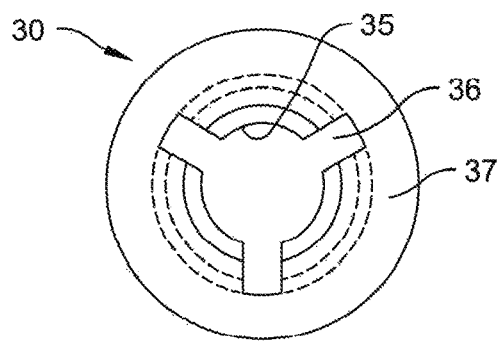
FIG. 4 is an elevation end view of the lock washer of FIG. 1 taken along line 4-4.

The terms "placard" and "card" are occasionally used herein interchangeably.

As shown in FIG. 1, a preferred embodiment of the novel placard holder 10 is a device comprising a clamp member 20 and a lock washer 30. The clamp member is generally mushroom-shaped with an enlarged, preferably hemispherical head 21 and an elongated body 22. The head has a convex front face 23 and a flat back face 24 so as to define a narrow card slot 25 extending completely across the front face. The card slot is open along the convex front face and penetrates into the head to a distance d between the bottom of the card slot and the back face. The hemispherical head is divided by the card slot to form two sections of preferably substantially equal size. The thin region of the head between the card slot and the back face defined by distance d thus connects the two sections of the hemispherical head.

In the embodiment of FIG. 1, head 21 of clamp member 20 is a composite of an enlarged end 27 of elongated body 22 and cap 26. The enlarged end is embedded into the cap such that the cap encapsulates the enlarged end. It is contemplated that the clamp member can be fabricated with the head being an integral part of the body such that no separate cap is present.

The body 22 includes a stem 28 having a longitudinal axis extending away from the the back face 24 and positioned centrally with respect thereto. Preferably the stem is cylindrical. Cross section of the head at the back face is characterized as being significantly larger than cross section of the stem. At least one circular tooth, and preferably a plurality of about 2-6, most preferably 4, circular teeth 29 protrude radially outward from the body and are disposed axially on the stem 28 distant from the back face. When plural teeth are deployed, they are spaced apart from each other at different distances from the back face. The teeth each have an axially flat annular side facing the head and a sloping annular contour on the side opposite the head. The sloping annular contour marked by reference line of number 29 in FIG. 1 can be convexly or concavely curved. The teeth function to lock the lock washer 30 in axial position on the body as will be explained, below.

The lock washer 30 is hollow ring 31 with multiple prongs 32 disposed around the circumference of one end of the ring and separated by gaps 36 as seen in FIG. 3. The prongs extend in a truncated conical configuration that tapers with distance from the base end of the ring. The hollow ring defines a central lumen 33 intended to receive the stem 28 of the body 22 of the clamp member 20. The prongs are provided with lips 34 having inner edges 35 of circular arcs. The inner edges collectively defining a circular profile of diameter smaller than the outer diameter of the circular teeth. Preferably the diameter of the circular profile is about the same diameter as the outer dimension of stem 28 so as to enable the lock washer to accept the stem of the body. The lock washer also has a land surface 37 defined by an annulus at the base end of ring 31 opposite the prongs and extending radially outward from the lumen to the circumference of the ring. Preferably the land surface is flat.

The placard holder is assembled by inserting the stem end of the clamp member through the ring of the lock washer. Material of construction, shape and dimensions of the lock washer relative to the body of the clamp member are selected such that the lock washer can be forced with slight manual or mechanically assisted pressure axially along the body from the stem end toward the head of the clamp member. As movement of the lock washer continues, the interior surfaces of the conical configuration of prongs contact the sloping contours of the teeth which deflects the prongs radially outward such that the circular profile effectively expands to allow the teeth to pass through the lumen. As the lock washer is moved closer to the head, the edges of the lips pass each successive tooth. Elasticity of the prong material causes the prongs to deflect toward their original, smaller circular profile diameter positions. The flat surfaces of the prongs come into contact with the flat annular side of opposing teeth. Orientation of the prongs due to the conical configuration prevents the lips from spreading and thereby locks the lock washer onto the body of the clamp member.

As will be explained, the novel placard holder can be utilized as a component of toys or other objects attractive to children. Thus it is an important aspect that the holder maintains its structural integrity so as to not accidentally disassemble and cause injury to a child. Advantageously axial spacing of the teeth and internal conical shape of the lumen defined by the prongs can improve the locking function of the lock washer to the clamp member as explained with reference to FIG. 6. The figure shows an enlarged detail view of a portion of the stem 41 of a clamp member body. Two adjacent representative teeth, T1 and T2 are shown. A single representative prong 42 is also shown in cross section in process of the lock washer being moved axially along the stem toward the head of the clamp member in the direction of arrow H. Specifically, prong 42 is shown having just passed over tooth T1 such that the flat surface 43 of the lip 34 (FIG. 3) is adjacent and in direct contact with the opposing flat annular side 44 of this tooth. As mentioned, the elasticity of the prong material and prong dimensions together with the orientation of the mating elements 43,44 of prong and tooth, respectively, prevents retraction of the lock washer from the stem (i.e., in direction opposite to arrow H). Moreover, due to the preselected slope of the prongs in a preferred embodiment, the extent of radial protrusion of the teeth beyond the surface of the stem causes the tip of the tooth (e.g., T2) to bias against the internal conical wall 45 of the prong. This generates increased compression between the flat face 43 of the lip and the flat face 44 of the opposing tooth that improves mechanical attachment of the lock washer to the stem.

In use the novel placard holder is attached to a supporting article for the primary purpose of stably displaying to a viewer a placard having visually perceptible and/or machine readable information. The placard holder presents the placard to the viewer in a fixed position relative to the supporting article. This display is accomplished by the clamp and lock washer technique of attaching the placard holder to the supporting article and by gripping of the placard inserted into the card slot.

Supporting articles suitable for use should have a thin wall structure at the position where the placard holder is mounted. The stem end of the clamp member is inserted through the wall with the enlarged head protruding on the side of the wall where the placard is to be viewed. A hole should be provided in the wall to allow penetration of the stem. A lock washer placed at the stem end and driven axially along the body of the clamp member to bias the back face 24 of the head and the land 37 of the lock washer on opposite sides of the supporting article wall. Dimensions of the lock washer prongs and clamp member teeth and thickness and compressibility of the wall material are selected such that compression between the head and lockwasher maintains the placard holder in fixed position on the supporting article.

The wall structure of the supporting article is thin relative to the technical length of the stem of the clamp member, i.e., the axial distance of the elongated stem from the back face of the head to the tip of the stem. In use the clamp member is inserted through a hole in the wall such that the tip of the stem and the head are on opposite sides of the wall and the lock washer is mounted onto the stem with the wall between clamp member and stem. Hence the wall should be sufficiently thin to permit the lock washer to deploy on the stem with the head of the clamp member being on the other side of the wall.

Figure 5:
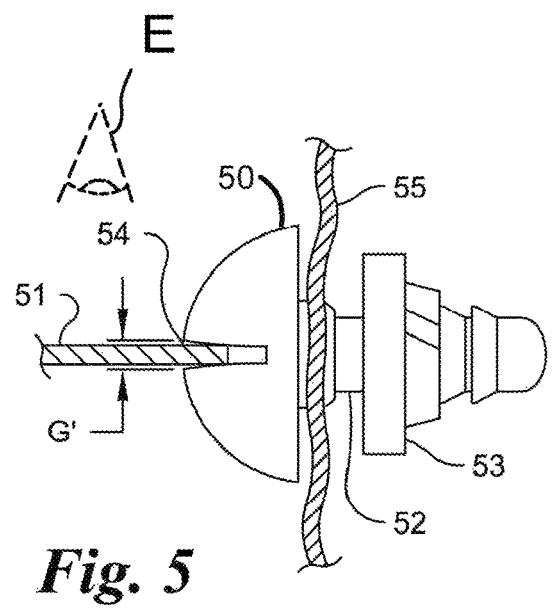
FIG. 5 is a side elevation view of a placard holder according to an embodiment of this invention protruding through a layer of fabric in a partial state of assembly in which the lock washer is not biased against the fabric and head of the clamp member.

Gripping of the card by the slot can be understood with reference to FIG. 5 that schematically illustrates card slot gap expansion due to card insertion. The drawing shows an embodiment of the novel placard holder 50 lodged in a segment of fabric 55 as is described in greater detail herein.

Figure 8:
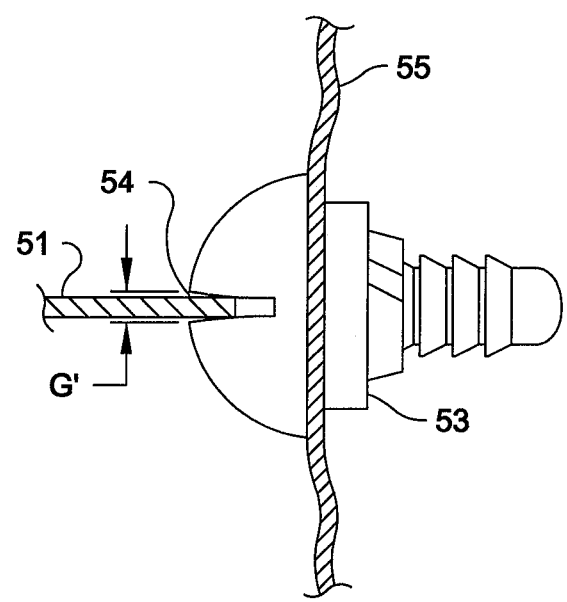
FIG. 8 is a side elevation view of a placard holder according to an embodiment of this invention protruding through a layer of fabric in a completed state of assembly in which the lock washer is biased against the fabric and head of the clamp member such that the placard holder is securely affixed to the fabric.

Holder 50 is shown with lock washer 53 installed on the stem of clamp member 52. The lock washer 53 is shown away from, and prior to clamping the fabric 55 to the back face of, the clamp member 52. An edge of a card 51 is shown inserted into card slot 54. Thickness of card 51 causes the sections of the clamp member head to separate such that the card slot gap G' is wider at the mouth of the card slot than at the base of the card slot. Rigidity of the clamp member head material serves to wedge the card edge firmly in the card slot. The wedged card 51 is maintained in fixed orientation relative to the placard holder. When the lock washer is driven fully against the fabric and back face as shown in FIG. 8, the placard holder and the placard will be held in fixed orientation relative to the supporting article.

In contemplated embodiments, the placards can be displayed on the supporting article for viewing and for presentation to be removed by the viewer. Representative example situations for such use include table seating placement card displays at formal dining events or retail sales displays of gift cards and greeting cards for consumer purchase. Because the card is friction fit into the slot by transverse compression of the opposing sections of the clamp member head, it is held in stable position for viewing yet can be simply removed by the viewer manually lifting the placard out of the card slot.

The novel placard holder is primarily intended for small placards. By small placards is meant sheets fitting within an area of a rectangle having width in the range of about 1 inch (2.54 cm) to about 5 inches (12.7 cm) and length in the range of about 1 inch (2.54 cm) to about 8 inches (20.3 cm). In addition to rectangular shaped placards, the novel placard holder is suitable for use with non-rectangular placards, such as circular, oval, polygonal, elliptical and irregularly shaped placards. The placard holder should be unobtrusive so as to not significantly detract from the visual effect of the placard. Thus preferably, the axial length of the placard holder measured from the peak of the head to tip of the stem of the clamp member is normally about 0.5 inch to about 1.5 inch (12-37 mm), and preferably about 0.5 inch to about 1.0 inch (12-25 mm), and most preferably about 0.75 inch (19 mm). The characteristic width of the back face of the head is preferably about 0.25 inch to about 0.75 inch (6-19 mm) and more preferably about 0.5 inch (12 mm).

The placard holder parts are preferably composed of polymeric plastics. These can be commodity plastics such as polystyrene, polyvinyl chloride, and polyolefins, for example, polypropylene and polyethylene. Engineering plastics may also be used such as polyamides, polyesters, polycarbonates, and polyacrylates to name a few. Polyethylene is preferred.

Length and width dimensions within the small placard size range of the placard set forth above are not critical provided that the card material is sufficiently stiff to remain in a display position when an edge of the card is inserted in the card slot of the placard holder. Representative examples of paperboard documents in common use that are contemplated to work well with the novel placard holder are standard stationery index cards of about 3 inches×about 5 inches (7.6×12.7 cm), standard business cards of about 2 inches×about 3.5 inches (5.1-8.9 cm) and name tags and greeting cards of various dimensions typically of sizes in the range of about 3-4 inches (7.6-10.2 cm) long and about 2-2.5 inches (5.1-6.4 cm) wide.

In addition for use with plain paperboard placards displaying human readable text and/or graphic information, the novel placard holder is very effective for holding and displaying plastic cards having optional embedded media of machine readable information. Representative examples of such machine readable information include magnetic strips, electromagnetic radiation generating devices such as RFID (radio frequency identification), and optically detectable coded strips such as bar and matrix codes. Placards of these type include, for example credit cards, gift cards, identification badges, hotel room door locking key cards, membership cards and the like. Plastic cards having international standard credit card dimensions of 3.375 inches (8.57 cm) long by 2.175 inches (5.52 cm) wide are excellent for use with this invention. Typically the thickness of plastic cards in current commercial use is in the range of about 0.025-0.035 inch (0.63-0.89 mm).

Whether paper or plastic, the card slot gap G (FIG. 2) and dimension d (FIG. 1) should be of size adapted to the thickness of the placard. That is, the card slot gap should enable the card to insert between the two sections of the clamp member head and be stably held in position by a friction fit. Thus the card slot gap 0.005-0.01 inch (0.12-0.25 mm) smaller than the placard thickness. For placard stock, such as plastic cards that are about 0.025-0.035 inch (0.63-0.89 mm) thick, the gap should be about 0.015-0.025 inch (0.38-0.63 mm) wide. Although the material of construction of the clamp member, and especially the head, is very rigid, using an appropriate dimension d permits the sections of the head to flex away from each other. The flexure is extremely slight and typically not visually perceptible without magnification. It is just enough to expand card slot gap G effectively to firmly grip an edge of a card inserted into the card slot. Typically dimension d is about 0.001-0.04 inch (0.02-1 mm).

It is contemplated that the novel placard holder should accept single cards with thicknesses of generally about 10-100 mils (0.25-2.5 mm), preferably about 15-45 mills (0.38-1.1 mm) and most preferably about 30 mils (0.76 mm). A placard holder of this invention having a specific card slot gap dimension can be utilized to hold multiple cards that are individually thinner than the card slot gap. For example, a holder with a card slot gap of nominally 30 mils (0.76 mm) can hold 3-4 cards that are each about 10 mils (0.25 mm) thick.

The novel placard holder is intended to be used primarily as shown schematically in FIG. 5 to hold a card 55 so that visually perceptible information on a side of card 51 can be viewed by an eye E. The card is desired to be maintained in position for viewing relative to a support article having a thin wall, represented for example by fabric 55. For example, the support article can be a sheet of flexible film, a sheet, a curtain of fabric and the like. A specific contemplated commercial utility for the novel placard holder is a display rack of gift cards at a retail store. Another potential utility is a storage and display unit at the check-in counter or in-room for presenting hotel key cards to guests. Yet another suggested utility is the presentation of seating reservation or personal identification cards of attendees to celebratory receptions such as fund-raising, wedding, theatrical, business conference, and other formal events.

Figure 7:
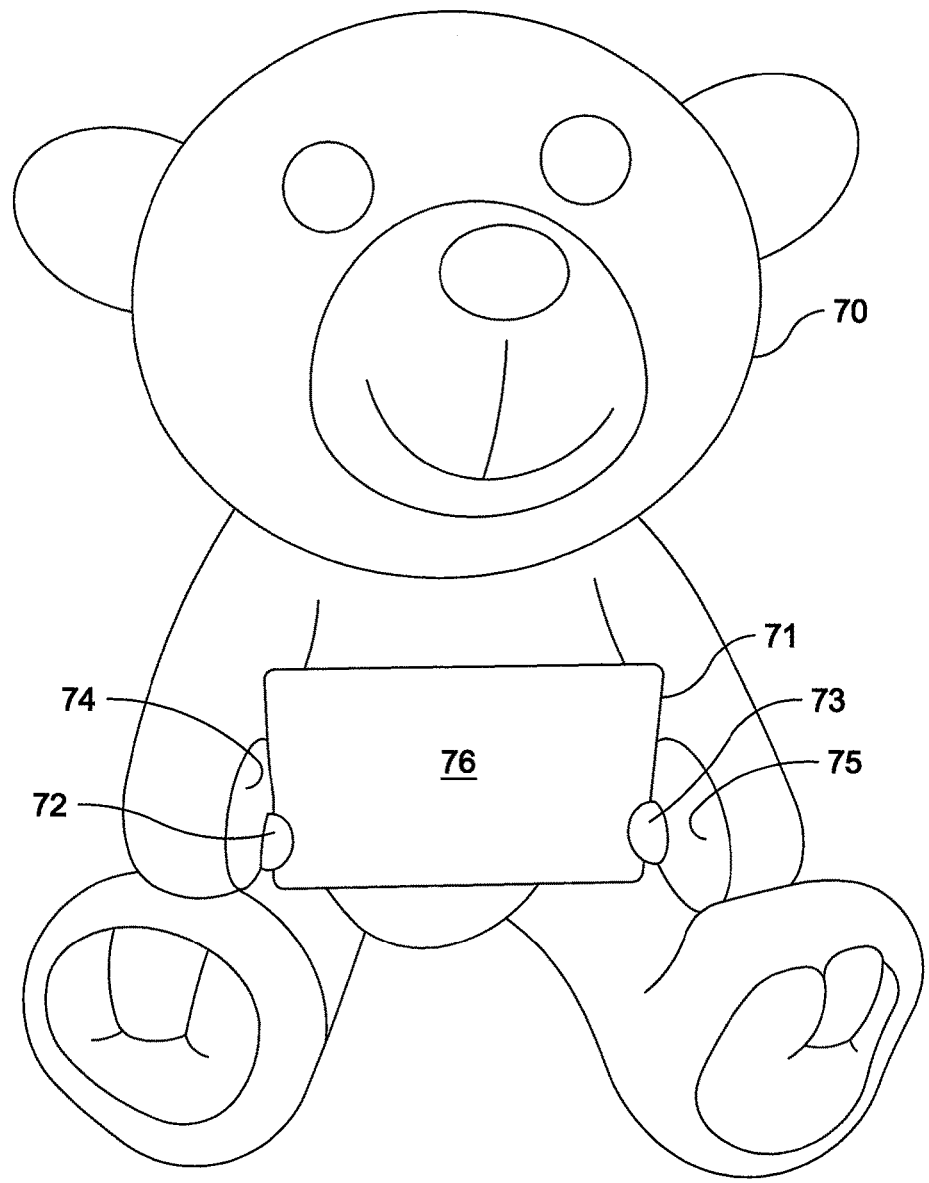
FIG. 7 is a front perspective view of a plush fabric toy to which are attached two placard holders according to this invention.

A much preferred article with which the novel placard holder is proposed to be used is a plush fabric toy. Such objects are not limited to animal designs but are also commonly referred to as "stuffed animals". The use of the novel placard holder with a plush fabric toy can be understood with reference to FIG. 7. This embodiment of the use of the invention employs two placard holders 72,73 mounted on the paws 74,75, respectively, of a toy of "Teddy bear" design 70. Each of the placard holders grips an opposite side of a plastic gift card 71 shown schematically. The gift card is representative of any similarly sized placard and for example, can have printed and/or graphic information on the card face 76 and back and optionally, a machine readable information strip. The type and design of the illustrated toy is not limiting and may be modeled after any animate or inanimate object.

Figure 6:
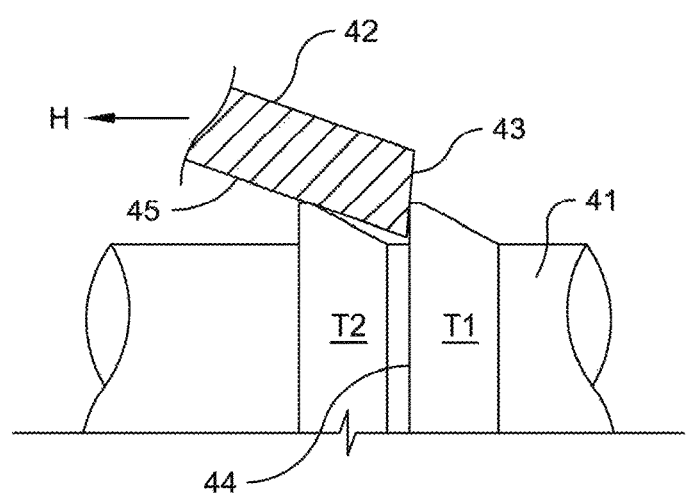
FIG. 6 is a detail view of a section of a stem of a clamp member for a placard holder according to an embodiment of this invention.

Importantly, the outer skin defining the perceived shape of the toy is formed at least in part by a thin fabric or film creating a largely hollow body that can contain a usually low density, easily compressible, fill material. For example, the skin of the bear's paws, among other areas is made of a soft fabric. Each placard holder deployed on the toy penetrates the outer skin such that the head of the clamp member extends outward from the body with the stem and the lock washer being under the skin inside the body. The placard holder is typically installed before the body surface is completely assembled and preferably before inserting filler material in the body so that there is access for installing the lock washer onto the stem. When the lock washer is driven completely toward the head of the clamp member, the fabric (corresponding to 55 in FIG. 5) in this example being on a paw of the body, will be firmly grasped between the back face 24 (FIG. 1) and the lock washer. The prongs of the lock washer will be locked by the teeth on the stem of the clamp member as shown in FIG. 6. Compressive force between the back face of the clamp member and the land surface of the lock washer firmly attach the placard holder to the article. The compressive force is also effective to maintain the card slot in desired rotational orientation about the axis of the stem such that a card inserted into the card slot will produce the desired visual effect.

Hemispherical shape of the clamp member head is not critical. Other shapes are contemplated such as a rectangular prismoid block (i.e., "brick"-shaped), or a faceted prismoid block, having flat and/or curved, outward facing front and sides, for example. Other modes of fastening the lock washer to the stem of the clamp member can be effective, such as screw thread and snap fastener methods. The prong and tooth technique disclosed herein is much preferred because it enables the lock washer to be locked onto the stem with forceful compression against the back face and is difficult to become accidentally disengaged.

FIGS. 1, 2 and 5 illustrate a placard holder having the plane of the card slot oriented perpendicular to the plane defined by the back face of the clamp member. Other orientations are also contemplated. For example, the card slot can be oriented parallel to the back face or at an oblique angle thereto. Moreover, centrally lateral position of the card slot as shown is not critical. The card slot can be located in the head at a position offset from the axis of the stem provided that the head shape offers sufficient material around the card slot to effectively grip a placard. It should be understood that the gripping function of the novel placard holder is free of mechanical card clamping mechanisms such as spring activated or wire clips. That is, the exclusive method of holding the placard is the friction fit grasp effected by the card slot.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope of the following claims. The entire content of any U.S. patents and patent applications disclosed herein are hereby incorporated by reference herein.

What is claimed is:

1. A placard holder comprising a clamp member and a lock washer
   in which the clamp member comprises a body comprising (i) an enlarged head having a front side defining a card slot and back side having a flat back face, and (ii) an elongated stem extending away from the back side of the head, and
   in which the lock washer comprises (a) a hollow cylinder having a base at one end of the cylinder, the base defining a land surface and in which the cylinder has a lumen extending along an axis from the base, and (b) a plurality of prongs at the end of the hollow cylinder opposite the base, the prongs forming a truncated conical configuration that tapers to smaller diameter with axial distance from the base, and
   in which the lock washer is adapted to mate with the clamp member by insertion of the stem into the lumen.

2. The placard holder of claim 1 in which each prong has a lip distant from the land surface, the lip having a circular arc-shaped inner edge positioned such the inner edges of all of the prongs collectively define a circular profile concentric with the axis.

3. The placard holder of claim 2 in which the clamp member comprises a circular tooth protruding radially outward from the stem.

4. The placard holder of claim 3 in which the body of the clamp member comprises multiple circular teeth protruding radially outward from the stem.

5. The placard holder of claim 4 in which the stem has an outer dimension and the circular profile has a diameter about the same as the outer dimension.

6. The placard holder of claim 4 in which each tooth has a flat annular side facing the head, and in which the clamp member is adapted to mate with the lock washer such that, with the stem inserted in the lumen and the base of the hollow cylinder oriented toward the back face of the head, the lips of the prongs engage the flat annular side of the teeth effectively to fasten the lock washer to the clamp member.

7. The placard holder of claim 1 in which the card slot extends completely across the front side of the head.

8. The placard holder of claim 7 in which the head is hemispherical and the card slot extends across a diameter of the head.

9. The placard holder of claim 7 in which the card slot defines a plane oriented perpendicularly to the back face of the head.

10. The placard holder of claim 7 in which the card slot defines a plane oriented parallel to the back face of the head.

11. The placard holder of claim 1 in which of the card slot defines a gap about 0.015-0.025 inch (0.38-0.63 mm) wide.

12. The placard holder of claim 1 further comprising a supporting article having a wall having opposite sides and defining a hole passing through the wall, in which the clamp member is positioned in the hole with the head on one side of the wall, in which the stem protrudes through the hole to the other side of the wall and is inserted in the lumen of the lock washer.

13. The placard holder of claim 12 in which the wall is a film or fabric.

14. The placard holder of claim 12 in which the support article is a plush animal toy.

15. A method of displaying a placard comprising the steps of
- (I) providing a clamp member comprising a body comprising (i) an enlarged head having a front side defining a card slot and back side having a flat back face, and (ii) an elongated stem extending away from the back side of the head,
- (II) providing a lock washer comprising (a) a hollow cylinder having a base at one end of the cylinder, the base defining a land surface and in which the cylinder has a lumen extending along an axis from the base, and (b) a plurality of prongs at the end of the hollow cylinder opposite the base, the prongs forming a truncated conical configuration that tapers to smaller diameter with axial distance from the base,
- (III) providing a support article having a wall defining opposite sides and a hole passing through the wall,
- (IV) inserting the clamp member into the hole such that the head is on one side of the wall and the stem protrudes through the hole to the other side of the wall,
- (V) inserting the stem into the lumen with the base of the hollow cylinder oriented toward the back face of the head, thereby mounting the lock washer on the clamp member on the other side of the wall, and
- (VI) moving the lockwasher along the axis of the clamp member toward the head and compressing the wall between the back face of the head and the base of the lock washer effectively to affix the clamp member and lock washer relative to the wall.

16. The method of claim 15 further comprising the steps of
- (VII) providing a placard of length and width size in the range of up to about 5 by about 8 inches (12.7 cm by 20.3 cm), and a placard thickness in the range of about 0.025 mm to about 0.35 mm, the placard defining an edge, and
- (VIII) inserting the edge of the placard into the card slot.

17. The method of claim 16 in which the card slot defines a gap of about 0.005-0.01 inch (0.12-0.25 mm) smaller than the placard thickness, such that the placard is removably fastened to the clamp member by a friction fit with the card slot.

* * * * *

UNITED STATES PATENT AND TRADEMARK OFFICE
CERTIFICATE OF CORRECTION

PATENT NO. : 9,576,507 B2
APPLICATION NO. : 14/808501
DATED : February 21, 2017
INVENTOR(S) : Craig Stanley Helmholz et al.

It is certified that error appears in the above-identified patent and that said Letters Patent is hereby corrected as shown below:

In the Claims

In Column 8, Line 55:
Change "in which of the card slot" to -- in which the card slot --

Signed and Sealed this
Eleventh Day of April, 2017

Michelle K. Lee
*Director of the United States Patent and Trademark Office*